United States Patent [19]

Chlupsa

[11] Patent Number: 5,080,943
[45] Date of Patent: Jan. 14, 1992

[54] TUBING

[75] Inventor: Otto Chlupsa, Goethestr. 52, D-6070 Langen, Fed. Rep. of Germany

[73] Assignees: Otto Chlupsa; Otto Vetter, both of Fed. Rep. of Germany

[21] Appl. No.: 537,420

[22] Filed: Jun. 13, 1990

[30] Foreign Application Priority Data

Jun. 15, 1989 [DE] Fed. Rep. of Germany ....... 8907321
Jul. 20, 1989 [EP] European Pat. Off. ......... 89113331.6

[51] Int. Cl.$^5$ .................................................. F16L 3/00
[52] U.S. Cl. .................................. 428/36.1; 428/35.7;
428/36.91; 428/73; 428/116; 428/284; 428/367;
428/368; 428/408; 156/172; 156/197; 156/215;
156/292; 138/109; 138/148; 138/153; 138/172;
138/DIG. 7
[58] Field of Search .................... 428/35.7, 36.1, 36.91,
428/73, 116, 284, 367, 368, 408; 138/148, 149,
153, 172, 174, 109, DIG. 7; 229/93; 156/172,
173, 175, 197, 215, 292

[56] References Cited

U.S. PATENT DOCUMENTS

| | | | |
|---|---|---|---|
| 3,145,000 | 8/1964 | Mackie | 428/116 |
| 3,490,983 | 1/1970 | Lee | 428/36.3 |
| 3,853,600 | 12/1974 | Hou | 428/367 |
| 4,773,656 | 9/1988 | Chlupsa | |

OTHER PUBLICATIONS

Modern Plastics Encyclopedia 1984–1985, pp. 125 and 126, Pub. by McGraw-Hill Inc., NY, 1984.

Primary Examiner—Patrick J. Ryan
Assistant Examiner—J. Weddington
Attorney, Agent, or Firm—Oldham & Oldham Co.

[57] ABSTRACT

Composite tube, which is a sandwich structure, comprising a plurality of fiber strata, each made of epoxy-saturated fibers, and at least one layer of a honeycomb material sandwiched between. The fiber strata and the honeycomb layers are in alternating sequence. Each fiber stratum may include a fiber web surrounded by a fiber cable, which consists essentially of a large number of twisted fibers arranged in the axial direction and parallel to each other. The composite tube of this invention is very light in weight, yet has tensile strength and other mechanical properties corresponding to those of conventional tubes made of steel. The tube of this invention is especially useful as a guide roller or an expansion shaft.

7 Claims, 2 Drawing Sheets

TUBING

TECHNICAL FIELD

The invention covers a tube, primarily for a guide roller, an expansion shaft, etc. made by using epoxy-saturated fibers.

BACKGROUND ART

Guide rollers are utilized in the sheet or roll material processing industry serving to guide the roll being processed. Ordinarily the guide rollers consist of steel tubes. The same applies to expansion shafts, which are capable of adjusting their diameters to the clamping action. Such expansion shafts of steel, for instance, are described in U.S. Pat. No. 4,773,656 and in German design registry No. DE-U-86 34 752.

The specific disadvantage of the conventional tubes and shafts, respectively, is their extremely heavy weight. For example, a guide roller made of steel tube measuring eight (8) meters in length with a diameter of 300 mm weights 1.25 tons.

Tubes made of a solid epoxy-saturated carbon fiber material are known to exist, however they are also relatively heavy if they are to meet all mechanical specifications.

DISCLOSURE OF THE INVENTION

Therefore, the invention is based on the objective to provide a composite tube, especially for a guide roller or an expansion shaft which meets all operational specifications, especially with regard to its deflection resistance, and which is characterized by its noticeably low weight.

Towards the achievement of this objective the invention according to a specific embodiment provides a composite tube of sandwich construction comprising a plurality of (i.e., two or more) epoxy-saturated fiber strata alternating with one or more layers of a honeycomb material sandwiched between successive fiber strata. The sandwich construction according to the invention provides surprisingly solid yet light tubes. For example, a tube of eight (8) meters in length with a diameter of 300 mm possesses the same mechanical characteristics as a tube with the same dimensions made of steel as described above but weighs only about 100 kg., i.e. less than one tenth of the weight of a comparable steel tube. The advantages inherent in such a light weight tube are evident.

For instance, smaller masses are pivoted, accelerated and decelerated and handling and transportation are also facilitated. During operation as a guide roller the respective roll of material is no longer charged with static electricity because slippage and friction are eliminated. Handling and transportation are tangibly facilitated.

For the honeycomb material a conventional honeycomb structure made of a paper material or a synthetic material is used. The epoxy combines the sandwich construction inseparably to form a one-piece tube. The honeycomb material also serves as a spacer in the sandwich construction and is provided for reasons of static stress.

The epoxy-saturated fiber strata will be constructed according to specifications. It may be sufficient to make each fiber stratum of one layer. However, the best and preferred results are achieved by making the inside fiber stratum (and each additional fiber stratum except the outermost) of a fiber fleece, a fiber web or fiber layer with a fiber cable applied to its outside. The fiber web serves to provide a smooth surface in making the tube so that, with the aid of a suitable parting compound, the tube can easily be pulled from the base mandrel on which the tube in accordance with this invention is made. Furthermore, the fiber web provides the necessary basic construction for the fiber bands applied. A fiber band, as per subject invention, is to be understood to be a large number of fibers arranged in an axial direction. Theses specifically provide the desired high deflection resistance of the tube. For the outside (or outermost) stratum a multilayered construction is also preferred with the outside stratum preferably comprising, from the inside to the outside, a fiber web, a fiber cable and a fiber band sealing it towards the outside. The fiber web seals the honeycomb material and keeps liquid epoxy from penetrating the honeycomb. Furthermore it provides the necessary structure for the upper layer of fiber cables which here are also arranged essentially in an axial direction to the tube and contribute essentially to the desired high degree of deflection resistance. The construction is sealed towards the outside by a fiber band with the fleece material as top layer to provide the necessary smooth outer surface of the tube.

With regard to the construction of the outside stratum, the same applies as was said about the inside stratum, e.g. the fiber web is preferably made much like a stocking with fiber strands criss-crossing at sharp angles. The fiber cable consists essentially of a large number of twisted fibers arranged in an axial direction around the tube and parallel to each other. Finally, the fiber band also consists essentially of fibers arranged in an axial direction, however joined by bias threads to form a flat, easily handled band. The fiber band does not have to be arranged in an axial direction but may also be coiled.

Generally, it should be indicated that the structure of the inside stratum and/or the outside stratum does not have to consist of pure carbon fibers. However, long continuous carbon fibers or aramid fibers should make up the major part. Other fibers may be blended in, e.g. fiber glass.

In following invention is cited by way of example which will further illustrate important characteristics. The example cites carbon fibers. In their place or in addition aramid fibers may also be used or fibers made of other materials which meet the required specifications especially with regard to tensile strength.

BEST MODE FOR CARRYING OUT THE INVENTION

Figure 1:
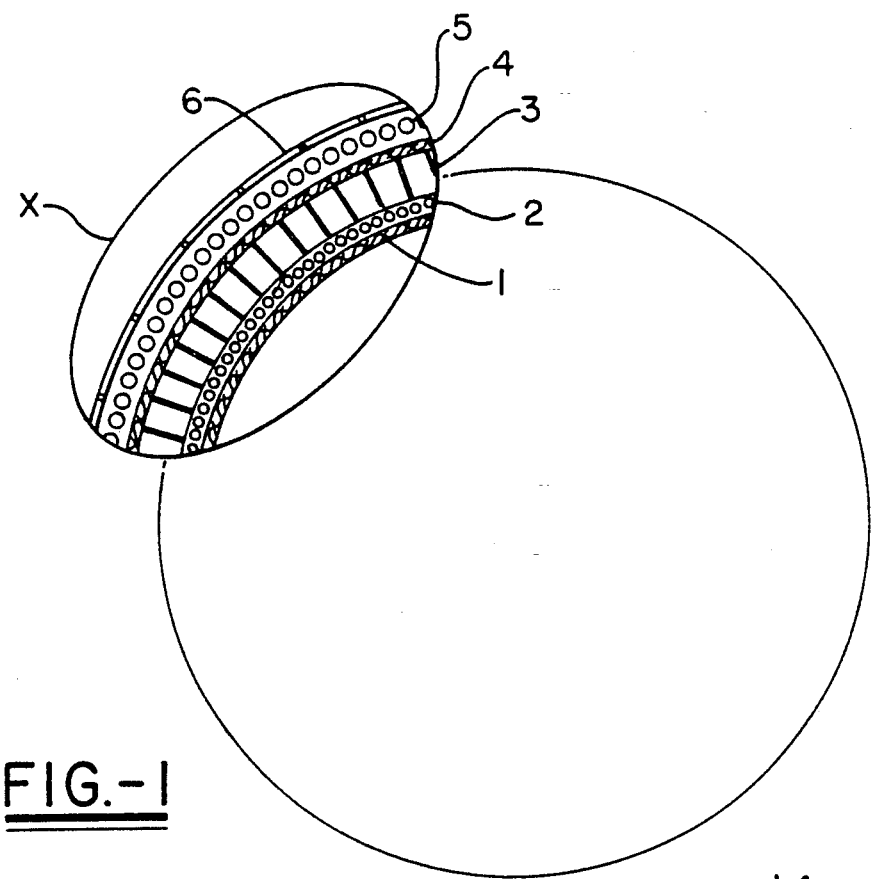
FIG. 1 shows the diagram of a face view of a tube as per subject invention with the structure of the tube in detail, shown inside oval X, enlarged for illustration purposes.

The perforated tube of this invention comprises an inside stratum 1, 2; a middle layer 3 made of honeycomb material; and an outside stratum 4, 5, 6.

The inside comprises a carbon fiber web 1 with a carbon fiber cable 2 to the outside thereof.

Figure 2:
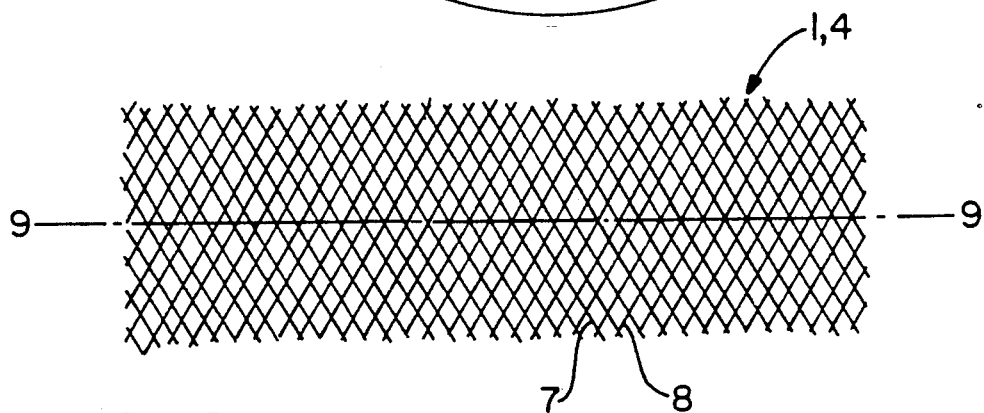
FIGS. 2 through 5 show in large scale the face views of a carbon fiber web, a carbon fiber cable, a carbon fiber band and honeycomb material in this sequence.

FIG. 2 shows a top view of the carbon fiber webs 1 and 4. As shown in FIG. 1, carbon fiber webs 1 and 4 each have strands 7, 8 of carbon fibers extending in two directions and crisscrossing at sharp angles. Axis 9 of the tube is also shown in this figure, and it will be observed that both sets of strands 7 and 8 are disposed at sharp angles to the axis 9 of the tube.

Figure 3:
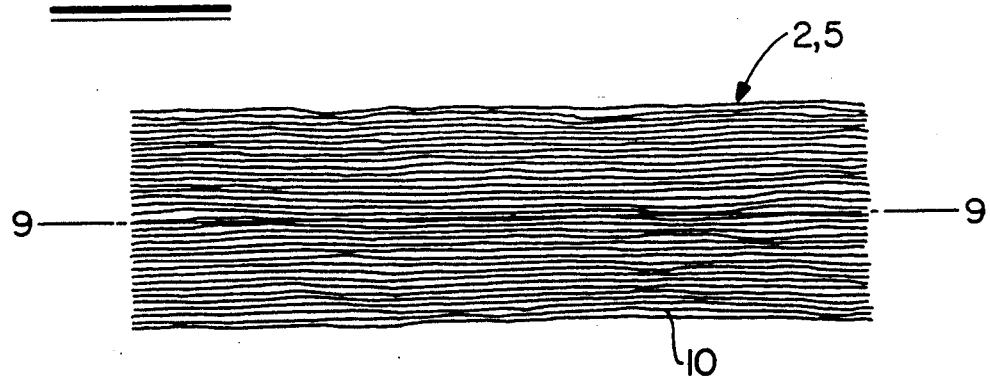

FIG. 3 shows, also in top view, a carbon fiber cable 2 or 5, each of which consists of a large number of twisted carbon fibers arranged in the axial direction 9 and essentially parallel to each other.

The outside fiber stratum comprises a carbon fiber web 4, which corresponds to the fiber web 1 and is similar or identical thereto. A carbon fiber cable 5 corresponding to carbon fiber cable 2 (similar or identical thereto) is placed over the carbon fiber web 4, and towards the outside the tube is covered by a carbon fiber band 6. This preferably coils around the tube.

Figure 4:
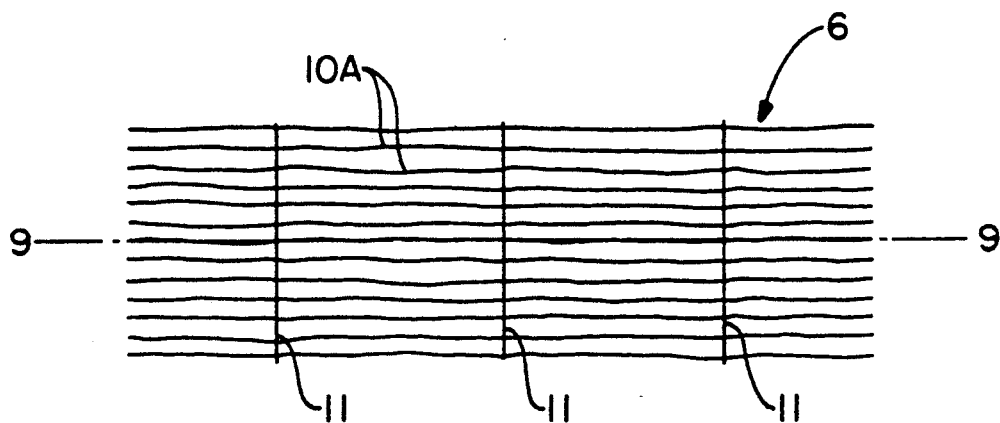

FIG. 4 shows the carbon fiber band 6 in top view. As shown in FIG. 4, carbon fiber band 6 consists of carbon fibers 10A joined by bias threads 11 to form a band. Carbon fibers 10A are essentially parallel to axis 9.

Figure 5:
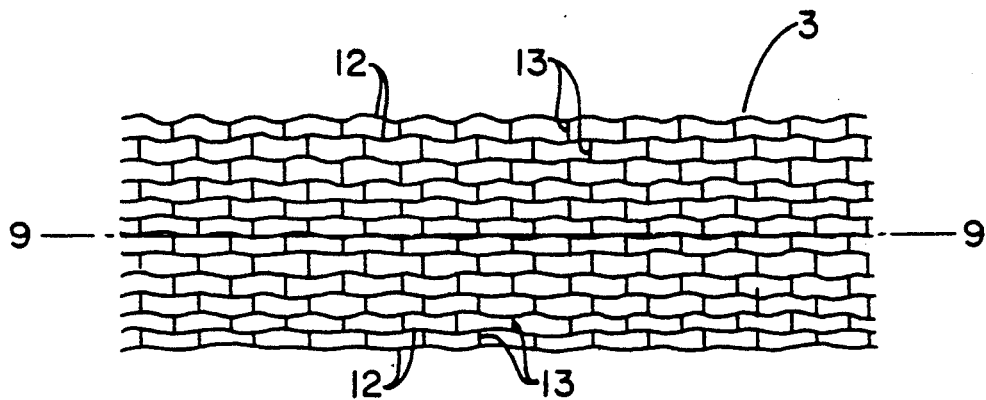

Referring now to FIG. 5, the middle layer comprises a honeycomb material 3 made up of a suitable paper material which is varnished or saturated with epoxy as required. This is a commercially sold product. As shown in FIG. 5, honeycomb material 3 has lengthwise webs 12, which are joined with bias webs 13 in a staggered pattern. Lengthwise webs 12 are arranged in the axial direction 9, and are essentially parallel to each other. In reality, the honeycomb material is formed by wave-like or generally sinusoidal bands which are glued to each other at the bases of the U-profiles. The double-layered bases form the bias webs 13 and the sides of the U-profiles form the length wise webs 12.

After appropriate completion the described tube serves as an expansion shaft.

A tube according to this invention may be made by the process described in applicant's co-pending application, Ser. No. 07/537,511, filed of even date herewith, and entitled, "PROCESS FOR MANUFACTURE OF A PERFORATED TUBE" (Attorney Docket No. 5205-K), which is incorporated by reference. Where the desired product composite tube of this invention is to be used in an expansion shaft, it will contain apertures as more particularly described in the co-pending application filed of even date herewith, and as also shown and described in U.S. Pat. No. 4,773,656. When apertures are not needed or desired, as for example when the tube of this invention is to be used for guide rollers, the projections used on the inner form shown and described in applicant's co-pending application will be omitted; otherwise the process may be as described therein.

The composite tube of this invention is much lighter in weight than metal tubes presently used for guide rollers and expansion shafts. Yet mechanical properties and particularly tensile strength which are comparable to those possessed by the presently used metal tubes. In short, the composite tube of this invention is light, yet strong, and suitable for guide rollers, expansion shafts and other purposes where strength is required and light weight is advantageous.

Figure 6:
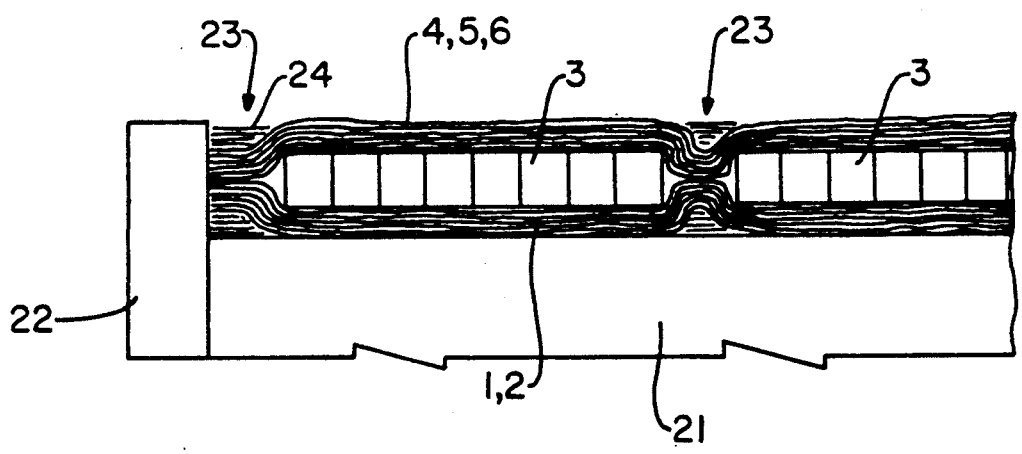
FIG. 6 shows the fastening of the fibers.

FIG. 6 shows the upper half of the left end of the tube of the invention with means for fastening the fibers of the strata within the tube.

A mandrel 21 is provided. Its diameter corresponds to the inner diameter of the tube to be made on this mandrel. To the ends of the mandrel a ring 22 is fixed. The tube is made in the area between both rings — only the left ring being shown in FIG. 6. The mandrel and the rings are for forming the components of the tube.

FIG. 6 shows that the honeycomb material 3 at its ends is shorter than the tube. A such formed gap 23 is filled with the epoxy saturated fibers of the inside stratum 1,2 and of the outside stratum 4,5,6. Also additional epoxy saturated fibers 24 are provided in the gap 23. For longer tubes, for instance over 1 meter length, additionally at least one intermediate gap 24 can be provided, also filled with epoxy saturated fibers of the inside and outside strata.

This is for better anchoring or fastening the continuous fibers of the strata.

Good results have been achieved with a tube having the following construction (all fiber strata being epoxy impregnated):

The inside stratum consists (from its inside to its outside) of: a tube consisting of the web of FIG. 2; followed by a spirally wound band of FIG. 5, its spiral angle being preferably between 30° and 55°; followed by a cable of FIG. 3 or a band of FIG. 4 and extending in axial direction, followed by a spirally wound band 6 of FIG. 4; followed by a fleece for closing the openings of the honeycomb material 3.

The structure of the tube of FIG. 2 is to enable to withdraw the completed tube from the mandrel 21. The spirally wound bands of FIG. 4 are to compact the material under them for better impregnating that material. They also smooth that material. The main purpose of the axial band of FIG. 3 or 4 is to give to the tube its bending strength.

The outside stratum consists (from its inside to its outside) of: a fleece for closing the openings of the honeycomb material; followed by a spirally wound band of FIG. 4; followed by the axial bands of FIGS. 3 and 4; followed by another spiral band of FIG. 4.

The structure consisting of the honeycomb material 3 and the outside stratum and/or inside stratum can be repeated one or several times to improve the strength of the tube.

What is claimed is:

1. A composite tube comprising:
an inside epoxy-saturated fiber stratum, an outside epoxy-saturated fiber stratum and a layer of honeycomb material sandwiched between said inside fiber stratum and said outside fiber stratum, wherein at least one fiber stratum consist primarily of carbon fibers, aramid fibers or both carbon fibers and aramid fibers each stratum consisting essentially of long continuous fibers saturated with epoxy resin; wherein said inside fiber stratum is a laminate comprising a fiber fleece, fiber web or fiber layer and a fiber cable on the outside of said fiber fleece, fiber web or fiber layer and said outside fiber stratum, from the inside to the outside comprises a fleece, a fiber cable and a fiber band; wherein at least one of said fiber strata comprises fibers which are arraigned in essentially the axial direction of the tube, and wherein said layer of honeycomb material at both ends of the tube is shorter than the tube, the gap between the ends of the honeycomb material and the ends of the tube being filled with epoxy saturated fibers of said inside and said outside fiber strata.

2. A tube according to claim 1 wherein said honeycomb material comprises paper or a synthetic material.

3. A tube according to claim 1 wherein said honeycomb material is varnished or saturated with an epoxy resin.

4. A tube according to claim 1 wherein said at least one fiber stratum comprises a fiber web and a fiber cable.

5. A tube according to claim 1, further comprising at least one sequence of an additional layer of honeycomb material and an additional of said outside fiber stratum, said additional layer of honeycomb material and said additional fiber stratum being on the outside of the aforesaid outside fiber stratum.

6. A tube according to claim 1, wherein at least one of such gaps is provided also between the ends of the tube, such additional gap being filled with epoxy saturated fibers of said inside and said outside fiber strata.

7. A tube according to claim 1 wherein said inside fiber stratum comprises from its inner side to its outer side a tube like web, a first spirally wound fiber band, a band or a cable extending in the axial direction of the tube, a second spirally wound fiber band and a fleece; and wherein said outside fiber stratum comprises from its inner side to its outer side a fleece, a third spirally wound fiber band, one or several fiber bands and fiber cables extending in the axial direction of the tube and spirally wound fiber band.

* * * * *